United States Patent [19]

Stachowiak

[11] Patent Number: 5,756,023
[45] Date of Patent: May 26, 1998

[54] METHOD OF PRODUCING REFORMED CROSSLINKED POLYETHYLENE ARTICLES

[75] Inventor: Robert S. Stachowiak, Commerce, Tex.

[73] Assignee: United States Brass Corporation, Dallas, Tex.

[21] Appl. No.: 655,459

[22] Filed: May 30, 1996

[51] Int. Cl.⁶ .................... B29C 47/00; B29C 67/00; B29C 71/02
[52] U.S. Cl. .............. 264/83; 264/209.1; 264/209.6; 264/210.2; 264/211.13; 264/236; 264/296; 264/322; 264/340; 264/345; 264/347; 264/348
[58] Field of Search .................. 264/83, 209.1, 264/209.6, 210.2, 211.13, 236, 296, 322, 340, 345, 347, 348, 494

[56] References Cited

U.S. PATENT DOCUMENTS

| | | |
|---|---|---|
| 1,128,156 | 2/1915 | Lamb . |
| 1,731,988 | 10/1929 | Skillman . |
| 2,699,575 | 1/1955 | Haury . |
| 2,974,367 | 3/1961 | Doering et al. . |
| 3,047,910 | 8/1962 | Downs . |
| 3,102,303 | 9/1963 | Lainson . |
| 3,205,289 | 9/1965 | Carpenter .................. 264/280 |
| 3,270,117 | 8/1966 | Hobson .................. 264/320 |
| 3,360,826 | 1/1968 | Lorang . |
| 3,370,118 | 2/1968 | Lowe .................. 264/325 |
| 3,418,409 | 12/1968 | Hesse et al. .................. 264/230 |
| 3,448,491 | 6/1969 | Sosnowski, Jr. et al. . |
| 3,495,301 | 2/1970 | Stephens et al. . |
| 3,509,252 | 4/1970 | Baehr .................. 264/296 |
| 3,509,599 | 5/1970 | Driza et al. . |
| 3,557,278 | 1/1971 | Kuhlemann .................. 264/318 |
| 3,599,287 | 8/1971 | Buck et al. . |
| 3,601,852 | 8/1971 | Bjahme . |
| 3,672,804 | 6/1972 | Dalik .................. 425/328 |
| 3,755,524 | 8/1973 | McKay .................. 264/138 |
| 3,806,301 | 4/1974 | Osterhagen et al. .................. 425/393 |
| 3,823,216 | 7/1974 | Petzetakis . |
| 3,843,300 | 10/1974 | McFarlane .................. 425/384 |
| 3,899,565 | 8/1975 | de Putter et al. .................. 264/296 |
| 3,910,744 | 10/1975 | Ronden et al. .................. 425/384 |
| 3,923,947 | 12/1975 | Cook .................. 264/141 |
| 3,929,943 | 12/1975 | Klimaszewski, Jr. . |
| 3,982,871 | 9/1976 | Möddel .................. 425/393 |
| 3,986,810 | 10/1976 | La Branche et al. .................. 425/393 |
| 4,028,037 | 6/1977 | Dawson .................. 425/392 |
| 4,059,379 | 11/1977 | Korff et al. .................. 425/393 |
| 4,065,243 | 12/1977 | Acda et al. .................. 425/393 |
| 4,083,918 | 4/1978 | Ronden et al. .................. 264/297 |
| 4,102,623 | 7/1978 | Mathison .................. 425/393 |
| 4,107,249 | 8/1978 | Murai et al. .................. 264/68 |
| 4,113,813 | 9/1978 | Wilson . |
| 4,117,195 | 9/1978 | Swarbrick et al. .................. 428/379 |
| 4,131,407 | 12/1978 | de Putter et al. .................. 425/393 |
| 4,140,739 | 2/1979 | Cotten .................. 264/138 |
| 4,167,388 | 9/1979 | Keelor et al. .................. 425/387.1 |
| 4,219,525 | 8/1980 | Greenspan .................. 264/296 |
| 4,264,661 | 4/1981 | Brandolf . |
| 4,269,801 | 5/1981 | Klasemaetal .................. 264/156 |
| 4,271,218 | 6/1981 | Heckel et al. . |
| 4,276,010 | 6/1981 | Shartzer .................. 425/143 |
| 4,279,853 | 7/1981 | Ohta et al. .................. 264/230 |
| 4,289,716 | 9/1981 | Voigt .................. 264/459 |

(List continued on next page.)

FOREIGN PATENT DOCUMENTS

| | | |
|---|---|---|
| 733643 | 3/1943 | Germany . |
| 2205586 | 8/1973 | Germany . |
| 2248471 | 4/1974 | Germany . |
| 2733643 | 2/1979 | Germany . |
| 2836798 | 3/1980 | Germany . |
| 2940719 | 4/1981 | Germany . |
| 4135017 | 4/1993 | Germany . |
| 4423372 | 1/1996 | Germany . |
| 53-56241 | 5/1978 | Japan . |
| 56-150511 | 11/1981 | Japan . |
| 57-8110 | 1/1982 | Japan . |
| 4-198201 | 7/1992 | Japan . |
| 5-156032 | 6/1993 | Japan . |
| 877735 | 9/1961 | United Kingdom . |
| 1336869 | 11/1973 | United Kingdom . |

OTHER PUBLICATIONS

"Examination of Cross Linked Polyethylene for Heating Systems", Rarosen & Je Bergman (Undated).
"Water and Pipes", pp. 31–33 (Undated).
"HIS 311 Schiebehülse" pp. 3–44 Technische Information (Undated).
"System Components JRG Sanipex Pipes Planning and Installation Guide" Handbook 88–1 (Undated).
"Pipes for Floor–Heating and Domestic Hot Water Supply" Golan Plastic Products (Undated).
"Standard Specification for Crosslinked Polythylene (PEX) Tubing" by American Society of Testing and Materials. Designation: F 876–93, pp. 942–946 (Undated).
"Polymer Crosslinking with Union Carbide Organofunctional Silan A–171" by Union Carbide (1992), SC–1702.
"Advances in Silane Crosslinking of Polyethylene", by L.M. Panzer (Undated).
"Methods and Benefits of Crosslinking Polyolefins for Industrial Applications" by Colin Beveridge & Andrew Sabiston (Undated).
"Standard Specification for Crosslinked Polyethylene (PEX) Plastic Hot– and Cold–Water Distribution Systems" by ASTM Committee F–17 (Undated).

*Primary Examiner*—Leo B. Tentoni
*Attorney, Agent, or Firm*—Catherine E. Bracken; Marlin R. Smith; J. Richard Konneker

[57] ABSTRACT

A method of producing reformed crosslinked polymer articles provides reformed crosslinked articles free of visible and objectionable folds, seams, and interfaces on reformed surfaces thereof. In a preferred embodiment, a method includes the steps of extruding a silane-grafted polyethylene tube, heating an end of the tube, reforming the end of the tube to produce a radially enlarged sealing surface thereon, cooling the reformed tube, and curing the reformed tube to produce an increase in the degree of crosslinking of the polyethylene material.

15 Claims, 1 Drawing Sheet

U.S. PATENT DOCUMENTS

| | | | |
|---|---|---|---|
| 4,316,870 | 2/1982 | Rowley | 264/296 |
| 4,323,337 | 4/1982 | Korff et al. | 425/155 |
| 4,333,898 | 6/1982 | Schmidtchen | 264/45.9 |
| 4,345,956 | 8/1982 | Cox et al. | 156/198 |
| 4,379,115 | 4/1983 | Seach et al. | 264/296 |
| 4,383,966 | 5/1983 | Svetlik | 264/296 |
| 4,394,343 | 7/1983 | Acda et al. | 264/296 |
| 4,404,159 | 9/1983 | McFarlane | 264/296 |
| 4,406,852 | 9/1983 | Riegel | 264/296 |
| 4,426,497 | 1/1984 | Kent | 525/194 |
| 4,428,900 | 1/1984 | Riley et al. | 264/526 |
| 4,446,084 | 5/1984 | Rowley | 264/40.6 |
| 4,446,283 | 5/1984 | Doi et al. | 525/344 |
| 4,457,886 | 7/1984 | Acda et al. | 264/249 |
| 4,525,136 | 6/1985 | Rowley | 425/384 |
| 4,664,423 | 5/1987 | Rowley | 285/256 |
| 4,803,033 | 2/1989 | Rowley | 264/339 |
| 4,857,250 | 8/1989 | Gale et al. | 264/83 |
| 4,891,173 | 1/1990 | Saitoh et al. | 264/22 |
| 4,902,460 | 2/1990 | Yagi et al. | 264/83 |
| 5,244,622 | 9/1993 | Rumberger | 264/319 |
| 5,505,900 | 4/1996 | Suwanda et al. | 264/477 |
| 5,514,312 | 5/1996 | Hardy et al. | 264/40.3 |
| 5,622,670 | 4/1997 | Rowley | 264/494 |

METHOD OF PRODUCING REFORMED CROSSLINKED POLYETHYLENE ARTICLES

BACKGROUND OF THE INVENTION

The present invention relates generally to methods of forming articles made of polyolefin materials and, in a preferred embodiment thereof, more particularly provides a method of producing reformed crosslinked polyethylene articles.

It is well known in the art to crosslink polyolefins. Such crosslinking is known to enhance certain physical and chemical properties of polyolefin materials. In particular, crosslinking has been shown to increase maximum useful temperature, reduce creep, improve chemical resistance, increase abrasion resistance, improve memory characteristics, improve impact resistance, increase resistance to oxidative degradation, and improve environmental stress crack resistance of polyolefin materials.

It is also well known in the art to subject polyethylene (PE) to a variety of crosslinking processes to produce crosslinked polyethylene (PEX). These PE crosslinking processes include addition of peroxide, addition of Azo compounds, electron beam irradiation, and addition of silane. The last of these utilizes silane to produce a grafted polymer.

Crosslinking of silane-grafted PE is described in a paper entitled "Polymer Crosslinking with Union Carbide(R) Organofunctional Silane A-171" published by Union Carbide Chemicals and Plastics Company, Inc. of Danbury, Conn., and in a paper entitled "Advances in Silane Crosslinking of Polyethylene" by L. M. Panzer of Union Carbide Chemicals and Plastics Company, Inc., Tarrytown, N.Y. both of which are hereby incorporated by reference.

In one silane crosslinking process known as Sioplas, a PE resin is melted and silane is added to the melted PE along with a peroxide initiator. Crosslinking sites are thereby formed on PE polymer chains and crosslinking begins to occur. The grafted resin is pelletized and stored for later use in foil-lined bags. As crosslinking of the grafted resin occurs in the presence of moisture, it is important that the grafted resin not be exposed to moisture until substantial crosslinking is desired. However, since this method of crosslinking of PE is self-perpetuating, the crosslinking reaction producing moisture as a byproduct, it is not practical to completely prevent crosslinking in the pelletized grafted PE resin and so it has a shelf life of only approximately 6–9 months.

A catalyst masterbatch is prepared for the grafted resin. The catalyst masterbatch typically includes a quantity of PE, a catalyst, an antioxidant, a stabilizer, and an internal lubricant. The catalyst masterbatch is typically pelletized for ease of mixing with the grafted resin in a conventional extruder.

The grafted resin and catalyst masterbatch are usually combined in a specific ratio, melted and mixed together, and extruded. When the grafted PE resin and catalyst masterbatch are mixed together, crosslinking of the PE at the silane graft sites accelerates. The material exits the extruder and is typically cooled in water.

In another silane crosslinking process known as Monosil, instead of preparing separate grafted PE resin and catalyst masterbatch, the PE resin, silane, peroxide initiator, catalyst, antioxidant, stabilizer, and internal lubricant are combined in one step. The materials are melted and mixed together, typically in the extruder, and extruded. A method of making crosslinked extruded products is described in U.S. Pat. No. 4,117,195, the disclosure of which is hereby incorporated by reference. As with the Sioplas method, in the Monosil process the material exits the extruder and is cooled in water.

To complete the crosslinking process, the extruded material from either the Sioplas or Monosil process is generally exposed to moisture at an elevated temperature. A sauna-like environment or hot water immersion will produce the desired level of crosslinking in a relatively short period of time. When this curing stage is finished, the PE may be approximately 65–89% crosslinked.

PEX has been utilized for diverse applications, including wire and cable insulation, and pipe. Where pipe is made of PEX, the crosslinking process enhances its ability to contain fluid at elevated temperature and pressure. For this reason, commercial success has been achieved in utilizing PEX pipe in hot water heating applications and in potable hot water plumbing applications.

A disadvantage of PEX pipe, however, is that it is not suitable for forming sealing surfaces thereon. For example, riser tubes may not be conveniently formed from PEX pipe by heating the PEX pipe and forming the heated pipe between mating dies as described in U.S. patent application Ser. No. 08/622,061, filed Mar. 26, 1996, and entitled "Automated Tube Reforming Apparatus and Associated Methods of Manufacturing", the disclosure of which is hereby incorporated by reference. Since the material is substantially crosslinked, such reforming of the PEX pipe typically produces visible and objectionable interfaces, seams, and folds, which provide leak paths across the sealing surface formed thereon.

From the foregoing, it can be seen that it would be quite desirable to provide a method of producing reformed crosslinked PE articles which does not produce visible and objectionable interfaces, seams, and folds on sealing surfaces of the articles, but which articles may be subsequently utilized in sealing applications, such as containment of pressurized hot water. It is accordingly an object of the present invention to provide such a method.

SUMMARY OF THE INVENTION

In carrying out the principles of the present invention, in accordance with an embodiment thereof, a method is provided which permits grafted polyolefin articles to be reformed with sealing surfaces thereon and subsequently crosslinked. The articles thus produced have the superior properties associated with crosslinked polyolefins, in combination with a desired functional shape, such as a hot water riser tube in plumbing applications having a radially enlarged sealing surface formed thereon.

In broad terms, a method of reforming a polymer material having a first shape as extruded from an extruder is provided. The method includes the steps of forming the extruded material so that the extruded material has a second shape, and then curing the extruded material. The polymer material may be a polyolefin, a silane-grafted polyolefin, and may be a silane-grafted polyethylene material.

In one aspect of the present invention, the forming step includes the steps of gauging a volume of the polymer material to be formed, heating the gauged volume of polymer material, forming the gauged volume of polymer material, and cooling the formed polymer material. The polymer material may be generally tubular-shaped prior to the forming step.

In another aspect of the present invention, the curing step includes subjecting the formed polymer material to moisture for a predetermined period of time. The formed material may also be heated while it is subjected to the moisture.

Also provided is a method of reforming and crosslinking a silane-grafted polyolefin article. The method includes the steps of heating the polyolefin article when it is approximately 40—60% crosslinked, reforming the heated polyolefin article between a pair of mating dies so that the heated polyolefin article is at least partially reshaped, cooling the reformed polyolefin article, and curing the reformed polyolefin article. The polyolefin article may be a tube made of silane-grafted polyethylene.

In one aspect of the present invention, the curing step includes subjecting the reformed polyolefin article to moisture until it is approximately 65–89% crosslinked. The curing step may be accomplished by placing the reformed polyolefin article in a steam chamber for a predetermined period of time.

Yet another method is provided by the present invention—a method of forming a radially enlarged sealing surface on a tube made of a silane-grafted polyethylene material. The method includes the steps of gauging a volume of the tube to be formed, heating the volume of the tube to be formed, forming the heated volume of the tube into the radially enlarged sealing surface when the tube is approximately 40–60% crosslinked, cooling the formed volume of the tube, and further crosslinking the tube.

In one aspect of the present invention, the further crosslinking step includes exposing the tube to water until the tube is approximately 65–89% crosslinked. The tube may be further crosslinked by disposing the tube in an enclosure and introducing steam into the enclosure.

The present invention also provides products produced by the above methods.

The use of the disclosed method enables convenient reforming of articles made of polymer materials. Significantly, the method permits tubes made of silane-grafted polyethylene to be reformed so that radially enlarged sealing surfaces are formed thereon, without also causing visible and objectionable folds, seams, or interfaces to be formed on the sealing surfaces. Thereafter, the tubes may be cured so that they may be used in applications requiring a relatively large percentage of crosslinking.

DETAILED DESCRIPTION

Figure 1:
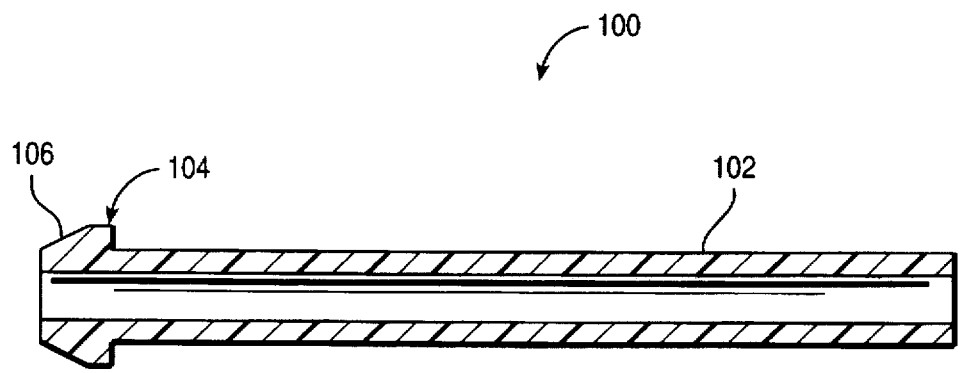
FIG. 1 is a cross-sectional view of a riser tube manufactured according to a method embodying principles of the present invention.

In a method embodying principles of the present invention, a polymer material is extruded from an extruder. The extruded polymer material is then reformed by gauging a volume of the extruded polymer material to be reformed, heating the gauged volume of extruded polymer material, reforming the gauged volume of extruded polymer material, cooling the reformed polymer material, and then curing the reformed polymer material.

Applicant has successfully utilized the method to produce articles, such as riser tubes, having sealing surfaces thereon. The sealing surfaces are formed on PE tubes substantially continuously extruded from an extruder. Applicant's method of producing reformed crosslinked riser tubes is described more fully hereinbelow, but it is to be understood that other articles may be produced without departing from the principles of the present invention.

Applicant procures repelletized PE resin in which the PE resin has been subjected to a silane grafting reaction. Thus, the PE resin has previously been melted, had silane and a free radical generator, such as a peroxide initiator, added thereto, and the silane has formed crosslinking sites on the PE polymer chains. The result is a grafted base PE resin which is repelletized. Note that, as soon as the PE resin has silane grafted thereto, some crosslinking may occur.

Applicant also procures a catalyst masterbatch. The catalyst masterbatch comprises a quantity of PE, a catalyst, an antioxidant, and a stabilizer. The catalyst masterbatch may also include an internal lubricant. Different formulations of catalyst masterbatch may be desired, for example, the internal lubricant may be considered optional. The catalyst masterbatch is also provided in pelletized form.

Applicant procures the grafted base PE resin and catalyst masterbatch from Padanaplast, located in Italy. The grafted base PE resin is sold under the tradename POLIDAN T/A. The catalyst masterbatch is sold under the tradename CATALYST PS.

The grafted base PE resin and catalyst masterbatch are introduced into a conventional extruder. The proportions are approximately 95% grafted base PE resin and 5% catalyst masterbatch, by weight. This mixture is then melted and mixed thoroughly in the extruder. Applicant prefers to use the above proportions, but it is to be understood that other proportions may be used without departing from the principles of the present invention, for example, if the grafted base PE resin and/or catalyst masterbatch are procured from different sources, different proportions of these components may be desirable.

The mixture is extruded by the extruder in tubing form, the tubing having approximate desired inside and outside diameters, and wall thickness. As the tubing exits the extruder, it is cooled by, for example, immersion in a liquid, such as water. As the tubing cools, it is sized to its desired dimensions.

When the tubing has been fully cooled, it is cut into pieces. Each of the pieces has a desired length appropriate for a riser tube, generally between 6 and 72 inches. Note that, when a volume of each tube piece is reformed as more fully described hereinbelow, the overall length of each tube piece will be somewhat shortened thereby, thus, this shortening of the tube pieces should be compensated for when the tube pieces are cut to length. Such tube pieces are suitable for loading into an automated tube reforming apparatus, such as that disclosed in U.S. patent application Ser. No. 08/622,061. It is to be understood that other tube reforming apparatus may be utilized in the method of the present invention without departing from the principles thereof.

At this point, the PE material of which each of the tubing pieces has been fabricated is approximately 40–60% crosslinked. Applicant prefers that the material be approximately 40% crosslinked for ease of forming. However, further crosslinking is required in order for the tubing pieces to meet the performance requirements of ASTM Standard F876-93 entitled "Standard Specification for Crosslinked Polyethylene (PEX) Tubing", which is hereby incorporated by reference. To meet those performance requirements, the tubing pieces as reformed must be crosslinked approximately 65–89%. Applicant utilizes ASTM Standard D2765 entitled "Test Methods for Determination of Gel Content and Swell Ratio of Crosslinked Ethylene Plastics", which is hereby incorporated by reference, to determine degree of crosslinking.

As will be readily apparent to one of ordinary skill in the art, a conventional unitary (i.e., one-piece) riser tube generally includes at least one radially enlarged sealing surface formed on an end thereof. If the sealing surface were formed on one of the tubing pieces after the PE material had been crosslinked approximately 65–89%, visible and objectionable folds, interfaces, or seams would be produced on the sealing surface. For this reason, applicant prefers that the tubing pieces be loaded into the automated tube reforming apparatus when the tubing pieces material has been crosslinked approximately 40%. It is to be understood, however, that the tubing pieces material may have other percentages of crosslinking at this point without departing from the principles of the present invention.

After the tubing pieces have been loaded into the automated tube reforming apparatus, the apparatus gauges the volume of material to be reformed for each tubing piece, clamps the tubing pieces in the apparatus, heats each gauged volume of material, reforms each heated volume of material between a pair of mating dies, cools each reformed volume of material, and releases the reformed tubing pieces for removal from the apparatus. When the heated volumes of material are reformed between the pairs of mating dies, the radially enlarged sealing surfaces are formed on the tubing pieces. Since the tubing pieces material is not fully crosslinked, the sealing surfaces are smooth and free of visible and objectionable folds, seams, and interfaces.

To more fully crosslink the tubing pieces material, and to ensure compliance with the ASTM Standard F876-93, after the tubing pieces are reformed by the automated tube reforming apparatus, they are subjected to a subsequent deliberate crosslinking step in which the reformed tubing pieces are loaded into a steam chamber. The steam chamber is an enclosure into which steam is introduced at atmospheric pressure.

Since crosslinking of the tube pieces material occurs in the presence of moisture and the rate of crosslinking is at least somewhat dependent on temperature, the amount of moisture and the temperature within the steam chamber may be adjusted to produce a desired rate of crosslinking in the tube pieces material. Applicant prefers that the tubing pieces be cured in the steam chamber for a period of 24 hours at 100% relative humidity and at 200–210 degrees F.

A sample of each group of reformed tubing pieces loaded into the steam chamber is tested thereafter (utilizing ASTM Standard D2765) to verify that the desired degree of crosslinking has been achieved (i.e., the material is fully crosslinked). For potable pressurized hot water applications, the reformed and cured tubing pieces should also be tested for conformance with ASTM Standard F877-93 entitled "Standard Specification for Crosslinked Polyethylene (PEX) Plastic Hot- and Cold-Water Distribution Systems", which is hereby incorporated by reference.

It is to be understood that other curing means may be utilized in the method. For example, the reformed tubing pieces may be immersed in water at an elevated temperature, such as 90 degrees Celsius, or the water may be directed to flow through the interior of each tubing piece. As another example, the reformed tubing pieces may be left to cure by exposure to humidity in ambient air. As used herein, the term "cure" means a process step that produces a deliberate increase in the degree of crosslinking of a polymer material to a desired level.

Thus has been described a method of producing formed crosslinked polyolefin articles. The method permits extruded material to be cooled and then reformed before it is more fully crosslinked. In a preferred embodiment of the method, silane-grafted base PE resin is melted and mixed with a catalyst masterbatch, and then extruded into tubing and cooled. The extruded tubing is then reformed by heating it and forming it between mating dies. The reformed tubing is then more fully crosslinked by exposure to steam within a chamber.

Representatively illustrated in FIG. 1 is a riser tube 100 manufactured according to the method described hereinabove. Riser tubes similar to the riser tube 100 shown in FIG. 1 are frequently used to connect plumbing fixtures, such as faucets, to hot and cold water distribution systems in buildings. It is to be understood that other products may be produced by the method described hereinabove without departing from the principles of the present invention.

When it is extruded from an extruder (not shown), the riser tube 100 has a continuous elongated tubular shape. A tubular body portion 102 of the riser tube 100 retains the tubular shape. After being cut to length and having an end portion 104 thereof reformed in the automated tube reforming apparatus, a radially enlarged sealing surface 106 is present on the end portion of the riser tube 100.

The riser tube 100 is then cured in a steam chamber until it is fully crosslinked. Applicant has successfully reformed and fully crosslinked riser tubes, similar to the riser tube 100, for hot water distribution systems in compliance with the ASTM Specification F877-93.

It is to be understood that other crosslinking processes, such as irradiation and addition of Azo compounds, may be utilized to cure a reformed PE article without departing from the principles of the present invention. For example, a reformed PE article may be exposed to beta radiation in order to cure the PE material.

The foregoing detailed description is to be clearly understood as being given by way of illustration and example only, the spirit and scope of the present invention being limited solely by the appended claims.

What is claimed is:

1. A method of reforming a polymer material having a first shape as extruded from an extruder, the method comprising the steps of:

crosslinking the extruded material while it has the first shape, the material being equal to or less than 60% crosslinked;

reforming the extruded material so that the extruded material has a second shape; and then further crosslinking the extruded material.

2. The method according to claim 1, wherein the polymer material is a silane-grafted polyolefin material.

3. The method according to claim 2, wherein the polyolefin material is polyethylene.

4. The method according to claim 1, wherein said reforming step comprises the steps of:

gauging a volume of the polymer material to be reformed;

heating the gauged volume of polymer material;

reforming the gauged volume of polymer material; and cooling the formed polymer material.

5. The method according to claim 1, wherein said further crosslinking step comprises subjecting the formed polymer material to moisture for a predetermined period of time.

6. The method according to claim 5, wherein said further crosslinking step further comprises heating the formed polymer material while the formed polymer material is subjected to said moisture.

7. The method according to claim 1, wherein the first shape is generally tubular, and wherein the second shape comprises a radially enlarged sealing surface formed on the first shape.

8. A method of reforming and crosslinking a silane-grafted polyolefin article, the method comprising the steps of:

heating the polyolefin article when it is less than or equal to 60% crosslinked;

reforming the heated polyolefin article between a pair of mating dies so that the heated polyolefin article is at least partially reshaped;

cooling the reformed polyolefin article; and further crosslinking the reformed polyolefin article.

9. The method according to claim 8, wherein said further crosslinking step comprises subjecting the reformed polyolefin article to moisture until the reformed polyolefin article is approximately 65–89% crosslinked.

10. The method according to claim 9, wherein said further crosslinking step further comprises placing the reformed polyolefin article in a steam chamber for a predetermined period of time.

11. The method according to claim 8, wherein the polyolefin article is a tube made of silane-grafted polyethylene.

12. A method of forming a radially enlarged sealing surface on a tube, the tube being made of a silane-grafted polyethylene material, the method comprising the steps of:

gauging a volume of the tube to be formed;

heating the volume of the tube to be formed;

forming the heated volume of the tube into the radially enlarged sealing surface when the tube is less than equal to 60% crosslinked;

cooling the formed volume of the tube; and further crosslinking the tube.

13. The method according to claim 12, wherein said further crosslinking step comprises exposing the tube to water until the tube is approximately 65–89% crosslinked.

14. The method according to claim 13, wherein said further crosslinking step is performed after said cooling step.

15. The method according to claim 13, wherein said further crosslinking step further comprises disposing the tube in an enclosure and introducing steam into the enclosure.

* * * * *